United States Patent
Mason

Patent Number: 5,119,583
Date of Patent: Jun. 9, 1992

[54] HOOKLESS FLY BODY CONSTRUCTION

[76] Inventor: Reynold E. Mason, 4239 Chico Way, Bremerton, Wash. 98312

[21] Appl. No.: 742,819

[22] Filed: Aug. 9, 1991

[51] Int. Cl.$^5$ .............................................. A01K 85/08
[52] U.S. Cl. .................................. 43/42.53; 43/42.25; 57/24
[58] Field of Search .................. 43/42.53, 42.25, 42.27, 43/44.98, 4, 4.5, 1, 42.26; 57/24, 25, 26, 203, 4; 242/7.19

[56] References Cited

U.S. PATENT DOCUMENTS

| | | | |
|---|---|---|---|
| 730,516 | 6/1903 | Culver | 57/26 |
| 1,523,895 | 1/1925 | Pott | 43/42.25 |
| 2,521,616 | 9/1950 | Weber | 43/42.24 |
| 2,611,985 | 9/1952 | Lloyd, Jr. | 43/42.25 |
| 3,690,029 | 9/1972 | Pobst | 43/42.25 |
| 4,149,334 | 4/1979 | Rogers | 43/42.25 |
| 4,292,797 | 10/1981 | Auger | 57/24 |
| 4,562,870 | 1/1986 | Calvin | 57/24 |
| 4,656,769 | 4/1987 | Walker | 242/1 |

FOREIGN PATENT DOCUMENTS 59-150135  8/1984  Japan ........................ 57/24

*Primary Examiner*—Richard K. Seidel
*Assistant Examiner*—Jeanne M. Eipel
*Attorney, Agent, or Firm*—Henderson & Sturm

[57] ABSTRACT

A fly body construction (100) fabricated by the steps of: twisting at least one strand of material (30) around a feather (20) continuing to twist the strand of material to store potential energy therein; joining the ends (31) and (32) of the strand of material (30); and, then releasing a portion of the kinetic energy to cause the twisted strand (30) to double over itself to create the finished fly body construction (100).

6 Claims, 2 Drawing Sheets

HOOKLESS FLY BODY CONSTRUCTION

TECHNICAL FIELD

The present invention relates to the field of fishing lures in general, and in particular to the area of fly body constructions for fly fishing.

BACKGROUND ART

As can be seen by reference to the following U.S. Pat. Nos. 2,521,616; 2,611,985; 3,690,029; and 4,149,334; the prior art is replete with myriad and diverse fishing lure and fly body constructions.

While all of the aforementioned prior art constructions are more than adequate for the basic purpose and function for which they have been specifically designed, these patented structures are also all uniformly deficient with respect to the fact that they all require that a fish hook form an integral part of the construction, such that the fly body becomes a dedicated part of the construction.

Obviously there are many instances wherein a fly body construction could be employed as an adjunct to many conventional lures, plugs, drift bobbers etc. without attaching the fly body directly to the hook shank per se.

As a consequence of the foregoing situation, there has existed a longstanding need among fishermen and lure manufacturers for a new method of creating a fly body construction other than by wrapping the fly body components directly onto a hook shank; and, the provision of such a construction is a stated objective of the present invention.

DISCLOSURE OF THE INVENTION

Briefly stated, the method that produces the fly body construction of the present invention comprises the steps of wrapping at least one length of yarn in a spiral fashion around an elongated feather; tightly twisting the spirally wound yard to store potential energy within the twisted yarn; looping the tightly twisted yarn around a stationary object such as a post or a peg, while the ends of the yarn are held in a captive side by side fashion; and then releasing the looped end of the twisted yarn from the peg or post so that the stored kinetic energy within the twisted yarn will cause the yarn to intertwine along the folded length of the yarn, thereby forming the fly body construction.

As will be explained in greater detail further on in the specification, this method allows compact full bodied fishing fly bodies to be quickly, simply and efficiently produced in a very inexpensive manner; wherein, the finished fly body construction may be subsequently impaled by a hook, added to an existing lure or plug construction, or secured to a short small diameter tube that slides down the fishing line to engage the shank of a fishing hook.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
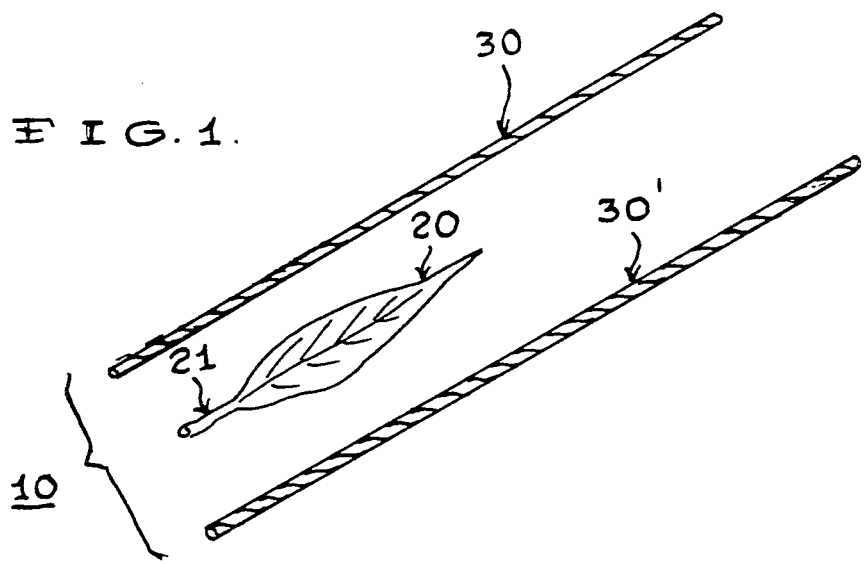
FIG. 1 is an exploded perspective view of the structural components employed in the preferred method of fabricating the fly body construction of this invention.
Figure 2:
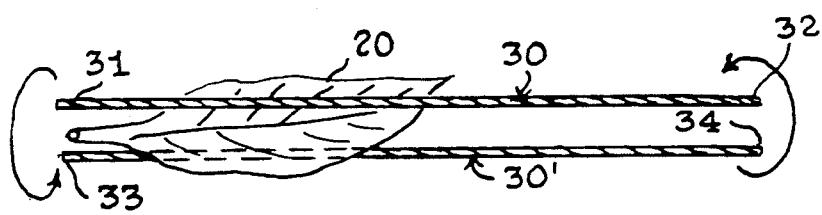
FIGS. 2 through 5 illustrate the method steps employed in the preferred method of construction.

As can be seen by reference to the drawings, and in particular to FIG. 1, the structural components that are employed to form the lure body construction that forms the basis of the present invention are designated generally by the reference numeral (10). In the preferred embodiment of the invention depicted in FIGS. 1 through 5, the structured components (10) comprise an elongated feather (20) and a plurality of elongated strands of yarn (30)(30'). However, in the alternate version of the preferred embodiment the components (10) comprise an elongated feather (20) and only a single strand of yarn (30).

In the preferred method of construction of the finished lure body (100) depicted in FIGS. 1 through 5, the feather (20) is disposed intermediate the two elongated strands (30)(30') of material such as yarn; wherein, the stem, (21) of the feather (20) is positioned proximate one pair of ends (31) (33) of the generally parallel aligned strands (30) (30') of yarn.

Figure 3:
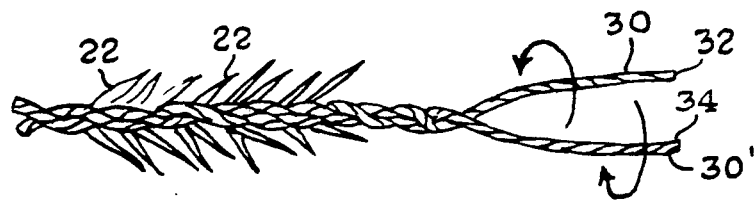
Figure 4:
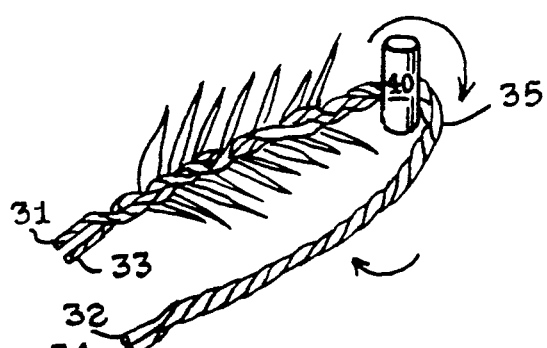
Figure 5:
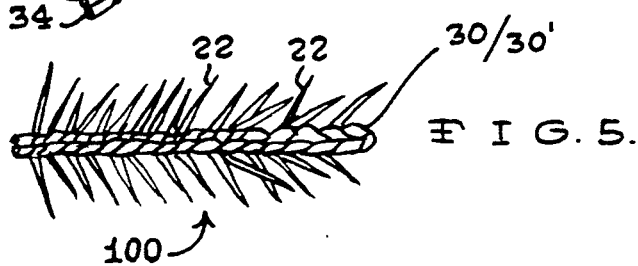
Figure 6:
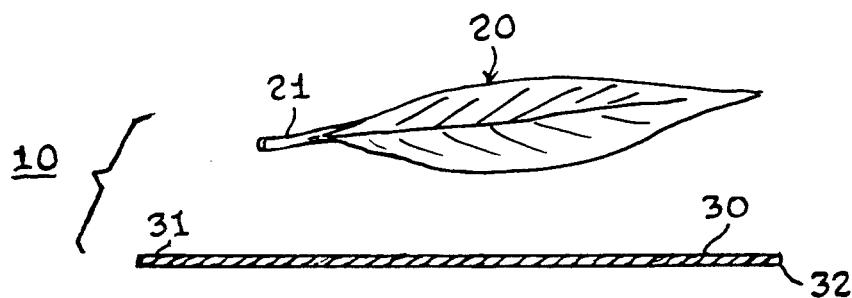
FIG. 6 is an exploded perspective view of the components employed in an alternate method of construction; and, FIGS. 7 through 9 illustrate the method steps employed in the alternate method of construction.
Figure 7:
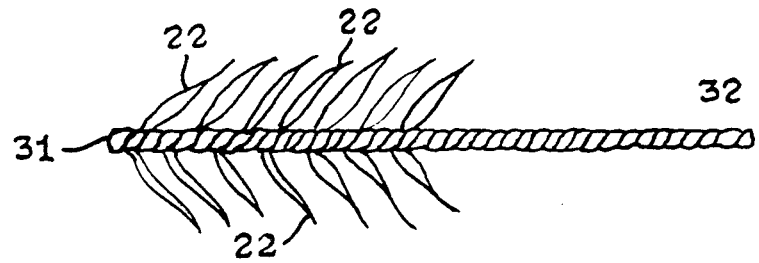
Figure 8:
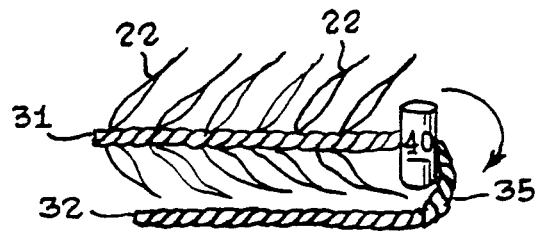
Figure 9:
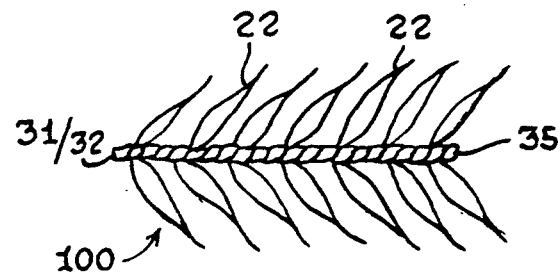

Then as shown in FIG. 3 the feather bearing ends (31) (33) of the strands of material (30) (30') are held in a captive fashion while the fee ends (32) (34) are spirally wound around one another and the feather (20) to create separated feather hackles (22). This spiral winding is then continued to store potential energy within the twisted strands (30) (30') of material.

Once the strands of yarn (30) (30') have been twisted tightly relative to one another and the feather (20) the twisted length of strands (30) (30') is folded in half and brought into engagement with a stationary object (40) such as post or peg while both twisted ends (31) (33) and (32) (34) are brought together in a captive fashion.

At this point the middle portion (35) of the twisted strands (30) (30') are disengaged from the peg or post (40); so that the stored kinetic energy within the strands (30) (30') will be released to cause the strands (30) (30') to intertwine and double over themselves to create the finished lure body when the joined ends (31) (32) (33) (34) are permanently secured to one another such as by adhesives.

In the alternate version of the preferred embodiment depicted in FIGS. 6 through 9, only a single strand of material (30) is spirally wound around the feather (20) to create separated feather hackles (22). Furthermore since only one strand (30) of yarn is employed only one end (31) of the strand (30) is immobilized while the other end (32) is twisted further to store kinetic energy within the tightly twisted strand (30).

At this point the tightly twisted strand (30) is folded in half around a post (40) or the like and the ends (31) (32) are permanently joined to one another as by adhesives (not shown); whereupon, the intermediate portion (35) of the twisted strand (30) is removed from engagement with the post (40) to cause the intermediate portion to intertwine and double over itself due to the stored kinetic energy within the twisted strand (30) to produce the finished fly body construction (100).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I CLAIM

1. A method of creating a fly body construction employing the steps of:
   a) placing a feather and at least one elongated strand of material adjacent to one another
   b) spirally winding the said at least one strand of material around the feather to create separated feather hackles
   c) continuing to tightly twist the, said at least one strand of material to store potential energy within the said at least one twisted strand of material
   d) bringing the opposite ends of said at least one strand of material together; and,
   e) releasing a portion of the stored potential energy within the said at least one strand to cause the said at least one strand to double over and intertwine with itself.

2. The method as in claim 1 further including the step of permanently joining together the ends of said at least one strand.

3. The method as in claim 1 wherein step d) further comprises the step of
   f) looping an intermediate portion of the said at least one strand around a stationary object prior to performing step e).

4. The method as in claim 1; wherein, said material comprises yarn.

5. A method of creating a fly body construction employing the steps of:
   a) placing a feather intermediate a plurality of elongated strands of material
   b) spirally winding the strands of material around one another to form separated feather hackles
   c) continuing to tightly twist the strands of material to store potential energy within said twisted strands of material
   d) joining the opposite ends of said twisted strands of material together; and,
   e) releasing a portion of the stored potential energy within said twisted strands to cause the twisted strands to double over themselves and the separated feather hackles.

6. The method as in claim 5; wherein, said material comprises yarn.

* * * * *